US011600049B2

United States Patent
Chen et al.

(10) Patent No.: US 11,600,049 B2
(45) Date of Patent: Mar. 7, 2023

(54) PERIMETER ESTIMATION FROM POSED MONOCULAR VIDEO

(71) Applicant: Magic Leap, Inc., Plantation, FL (US)

(72) Inventors: Zhao Chen, Mountain View, CA (US); Ameya Pramod Phalak, Sunnyvale, CA (US); Vijay Badrinarayanan, Mountain View, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/856,980

(22) Filed: Apr. 23, 2020

(65) Prior Publication Data

US 2020/0342674 A1    Oct. 29, 2020

Related U.S. Application Data

(60) Provisional application No. 62/848,492, filed on May 15, 2019, provisional application No. 62/838,265, filed on Apr. 24, 2019.

(51) Int. Cl.
  G06T 19/00    (2011.01)
  G06T 7/50    (2017.01)
  G06T 7/13    (2017.01)

(52) U.S. Cl.
  CPC .............. G06T 19/006 (2013.01); G06T 7/13 (2017.01); G06T 7/50 (2017.01); G06T 19/003 (2013.01);
  (Continued)

(58) Field of Classification Search
  CPC ........... G06T 19/006; G06T 7/50; G06T 7/13; G06T 19/003
  See application file for complete search history.

(56) References Cited

U.S. PATENT DOCUMENTS 9,454,820 B1 * 9/2016 Kirmani ................... H04N 5/33
10,269,257 B1 * 4/2019 Gohl ......................... G06T 5/00
(Continued)

FOREIGN PATENT DOCUMENTS

| WO | 2015192117 A1 | 12/2015 |
| WO | 2017100658 A1 | 6/2017 |
| WO | 2017117675 A1 | 7/2017 |

OTHER PUBLICATIONS

Yang, S., Maturana, D., & Scherer, S. (May 2016). Real-time 3D scene layout from a single image using convolutional neural networks. In 2016 IEEE international conference on robotics and automation (ICRA) (pp. 2183-2189). IEEE.*

(Continued)

*Primary Examiner* — Sarah Lhymn
(74) *Attorney, Agent, or Firm* — Kilpatrick Townsend & Stockton LLP

(57) ABSTRACT

Techniques for estimating a perimeter of a room environment at least partially enclosed by a set of adjoining walls using posed images are disclosed. A set of images and a set of poses are obtained. A depth map is generated based on the set of images and the set of poses. A set of wall segmentation maps are generated based on the set of images, each of the set of wall segmentation maps indicating a target region of a corresponding image that contains the set of adjoining walls. A point cloud is generated based on the depth map and the set of wall segmentation maps, the point cloud including a plurality of points that are sampled along portions of the depth map that align with the target region. The perimeter of the environment along the set of adjoining walls is estimated based on the point cloud.

20 Claims, 9 Drawing Sheets

(52) U.S. Cl.
CPC .............. *G06T 2207/10024* (2013.01); *G06T 2207/10028* (2013.01); *G06T 2210/56* (2013.01)

(56) References Cited

U.S. PATENT DOCUMENTS

| | | | |
|---|---|---|---|
| 10,679,046 B1* | 6/2020 | Black | G06T 17/00 |
| 2010/0111370 A1 | 5/2010 | Black et al. | |
| 2010/0315412 A1* | 12/2010 | Sinha | G06T 7/143 345/419 |
| 2012/0195471 A1 | 8/2012 | Newcombe et al. | |
| 2014/0043436 A1 | 2/2014 | Bell et al. | |
| 2015/0063707 A1* | 3/2015 | Fu | G06K 9/00201 382/199 |
| 2016/0026253 A1* | 1/2016 | Bradski | H04N 13/344 345/8 |
| 2016/0271795 A1 | 9/2016 | Vicenti | |
| 2016/0321838 A1* | 11/2016 | Barone | G06T 5/50 |
| 2016/0364612 A1* | 12/2016 | Dixon | G06K 9/2081 |
| 2016/0364871 A1* | 12/2016 | Dixon | G06K 9/2018 |
| 2016/0364966 A1* | 12/2016 | Dixon | G08B 13/19606 |
| 2016/0366348 A1* | 12/2016 | Dixon | G06K 9/3233 |
| 2017/0148155 A1* | 5/2017 | Wei | G06T 7/73 |
| 2017/0228940 A1* | 8/2017 | Kutliroff | G06T 7/12 |
| 2017/0243352 A1* | 8/2017 | Kutliroff | G06T 19/006 |
| 2018/0018805 A1* | 1/2018 | Kutliroff | G06T 7/90 |
| 2018/0144458 A1* | 5/2018 | Xu | G06T 7/70 |
| 2019/0051056 A1* | 2/2019 | Chiu | G06T 7/136 |
| 2019/0213389 A1* | 7/2019 | Peruch | G06K 9/00201 |
| 2019/0371051 A1* | 12/2019 | Dore | G06T 17/00 |
| 2020/0226814 A1* | 7/2020 | Tang | G06F 3/04842 |
| 2020/0302621 A1* | 9/2020 | Kong | G06T 7/75 |
| 2020/0302686 A1* | 9/2020 | Totty | G06T 5/50 |
| 2020/0312029 A1* | 10/2020 | Heinen | G06T 7/579 |
| 2020/0372626 A1* | 11/2020 | Dal Mutto | G06T 17/00 |

OTHER PUBLICATIONS

Fuhrmann, Simon, and Michael Goesele. "Fusion of depth maps with multiple scales." ACM Transactions on Graphics (TOG) 30, No. 6(2011): 1-8.*

Badrinarayanan, et al., "SegNet: A Deep Convolutional Encoder-Decoder Architecture for Image Segmentation", IEEE Transactions on Pattern Analysis and Machine Intelligence, vol. 39, No. 12, Dec. 2017, 15 pages.

Laina, et al., "Deeper Depth Prediction with Fully Convolutional Residual Networks", IEEE International Conference on 3D Vision 2016, Sep. 19, 2016, 12 pages.

Lee, et al., "RoomNet: End-to-End Room Layout Estimation", aiXiv:1703.06241v2, Aug. 7, 2017, 10 pages.

Liu, et al., "FloorNet: A Unified Framework for Floorplan Reconstruction from 3D Scans", arXiv:1804.00090v1, Mar. 31, 2018, 18 pages.

PCT/US2020/029614, "International Search Report and Written Opinion", dated Jul. 2, 2020, 7 pages.

Zhou, et al., "Semantic Understanding of Scenes through the ADE20K Dataset", arXiv:1608.05442v2, Oct. 16, 2018, 19 pages.

Application No. PCT/US2020/029614, International Preliminary Report on Patentability, dated Nov. 4, 2021, 6 pages.

"Cluster Analysis", Available online at: https://en.wikipedia.org/w/index.php?title=Cluster analysis&oldid= 759382754, Jan. 10, 2017, pp. 1-16.

"Random Sample Consensus", Available online at: https://en.wikipedia.org/w/index.php title=Random_sample_consensus&oldid= 868775538, Nov. 14, 2018, pp. 1-9.

Application No. EP20794623.7 , "Extended European Search Report", dated May 30, 2022, 12 pages.

Katashi et al., "Building-Scale Virtual Reality: Another Way to Extend Real World", IEEE Conference on Multimedia Information Processing and Retrieval, Mar. 28, 2019, pp. 205-211.

Phalak et al., "DeepPerimeter: Indoor Boundary Estimation from Posed Monocular Sequences", Cornell University Library, Apr. 25, 2019, pp. 1-10.

* cited by examiner

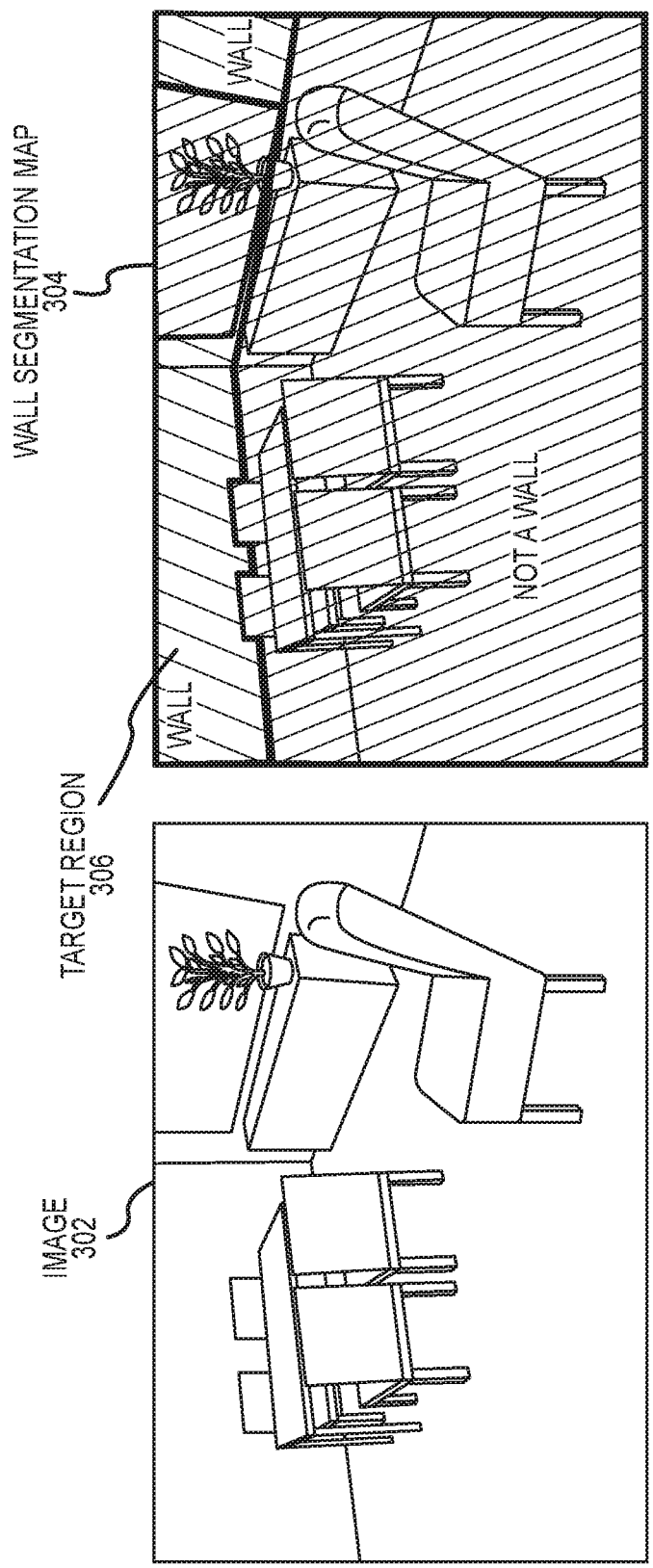

PERIMETER ESTIMATION FROM POSED MONOCULAR VIDEO

CROSS-REFERENCES TO RELATED APPLICATIONS

This application claims the benefit of priority to U.S. Provisional Patent Application No. 62/838,265, filed Apr. 24, 2019, entitled "SYSTEMS AND METHODS FOR DEEP INDOOR BOUNDARY ESTIMATION FROM POSED MONOCULAR VIDEO", and to U.S. Provisional Patent Application No. 62/848,492, filed May 15, 2019, entitled "SYSTEMS AND METHODS FOR DEEP INDOOR BOUNDARY ESTIMATION FROM POSED MONOCULAR VIDEO", the contents of which are herein incorporated in their entirety.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates to computing systems, methods, and configurations, and more specifically to computing systems, methods, and configurations wherein understanding three-dimensional (3D) geometric aspects of an environment is important, such as in applications which may involve computing systems for augmented reality (AR), navigation, and general scene understanding.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: obtaining a set of images and a set of poses corresponding to the set of images, the set of images having been captured of an environment at least partially enclosed by a set of adjoining walls. The method also includes generating a depth map of the environment based on the set of images and the set of poses. The method also includes generating a set of wall segmentation maps based on the set of images, each of the set of wall segmentation maps indicating a target region of a corresponding image from the set of images that contains the set of adjoining walls. The method also includes generating a point cloud based on the depth map and the set of wall segmentation maps, the point cloud including a plurality of points that are sampled along portions of the depth map that align with the target region. The method also includes estimating a perimeter of the environment along the set of adjoining walls based on the point cloud. Other embodiments of this aspect include corresponding computer systems, apparatus, and computer programs recorded on one or more computer storage devices, each configured to perform the actions of the methods.

Implementations may include one or more of the following features. The method further including: capturing, using one or more sensors, the set of images and the set of poses, where obtaining the set of images and the set of poses includes receiving the set of images and the set of poses from the one or more sensors. The method where the one or more sensors includes an image sensor configured to capture the set of images and a pose sensor configured to capture the set of poses. The method further including: identifying a set of clusters for the point cloud, each of the set of clusters including a subset of the plurality of points, and where each of the set of clusters is determined to correspond to a different wall from the set of adjoining walls. The method where the plurality of points include 2D points, and where estimating the perimeter of the environment along the set of adjoining walls based on the point cloud includes: fitting a line to the plurality of points for each of the set of clusters, resulting in a plurality of lines. The method may also include forming a closed loop by extending the plurality of lines until reaching intersection points. The method where the plurality of points include 3D points, and where estimating the perimeter of the environment along the set of adjoining walls based on the point cloud includes: fitting a plane to the plurality of points for each of the set of clusters, resulting in a plurality of planes. The method may also include forming a closed loop by extending the plurality of planes until reaching intersection lines. The method where the set of images include RGB images. The method where the set of poses include camera orientations of an image sensor that captured the set of images. The method where the plurality of points include 3D points. Implementations of the described techniques may include hardware, a method or process, or computer software on a computer-accessible medium.

One general aspect includes a system including: one or more processors; and a computer-readable medium including instructions that, when executed by the one or more processors, cause the one or more processors to perform operations including: obtaining a set of images and a set of poses corresponding to the set of images, the set of images having been captured of an environment at least partially enclosed by a set of adjoining walls. The operations also include generating a depth map of the environment based on the set of images and the set of poses. The operations also include generating a set of wall segmentation maps based on the set of images, each of the set of wall segmentation maps indicating a target region of a corresponding image from the set of images that contains the set of adjoining walls. The operations also include generating a point cloud based on the depth map and the set of wall segmentation maps, the point cloud including a plurality of points that are sampled along portions of the depth map that align with the target region. The operations also include estimating a perimeter of the environment along the set of adjoining walls based on the point cloud. Other embodiments of this aspect include corresponding computer systems, apparatus, and computer programs recorded on one or more computer storage devices, each configured to perform the actions of the methods.

Implementations may include one or more of the following features. The system where the operations further include: capturing, using one or more sensors, the set of images and the set of poses, where obtaining the set of images and the set of poses includes receiving the set of images and the set of poses from the one or more sensors. The system where the one or more sensors includes an image sensor configured to capture the set of images and a pose sensor configured to capture the set of poses. The system where the operations further include: identifying a set of clusters for the point cloud, each of the set of clusters including a subset of the plurality of points, and where each of the set of clusters is determined to correspond to a different wall from the set of adjoining walls. The system where the plurality of points include 2D points, and where estimating the perimeter of the environment along the set of adjoining walls based on the point cloud includes: fitting a line to the plurality of points for each of the set of clusters, resulting in a plurality of lines. The system may also include forming a closed loop by extending the plurality of lines until reaching intersection points. The system where the plurality of points include 3D points, and where estimating the perimeter of the environment along the set of adjoining walls based on the point cloud includes: fitting a plane to the plurality of points for each of the set of clusters, resulting in a plurality of planes. The system may also include forming a closed loop by extending the plurality of planes until reaching intersection lines. The system where the set of images include RGB images. Implementations of the described techniques may include hardware, a method or process, or computer software on a computer-accessible medium.

Numerous benefits are achieved by way of the present invention over conventional techniques. For example, embodiments of the present invention are able to leverage currently available deep network methods to precisely infer a room perimeter with no enumerated set of the types of possible rooms and with robustness against corner and edge occlusions. For example, described embodiments do not rely on a list of possible a priori room shapes. Additionally, described embodiments do not rely on the availability of high-quality interior point clouds at model input. Further, results using described embodiments have established important benchmarks for perimeter estimation.

BRIEF DESCRIPTION OF THE DRAWINGS

FIGS. 3A and 3B illustrate an example of a wall segmentation.

DETAILED DESCRIPTION OF SPECIFIC EMBODIMENTS

Figure 1:
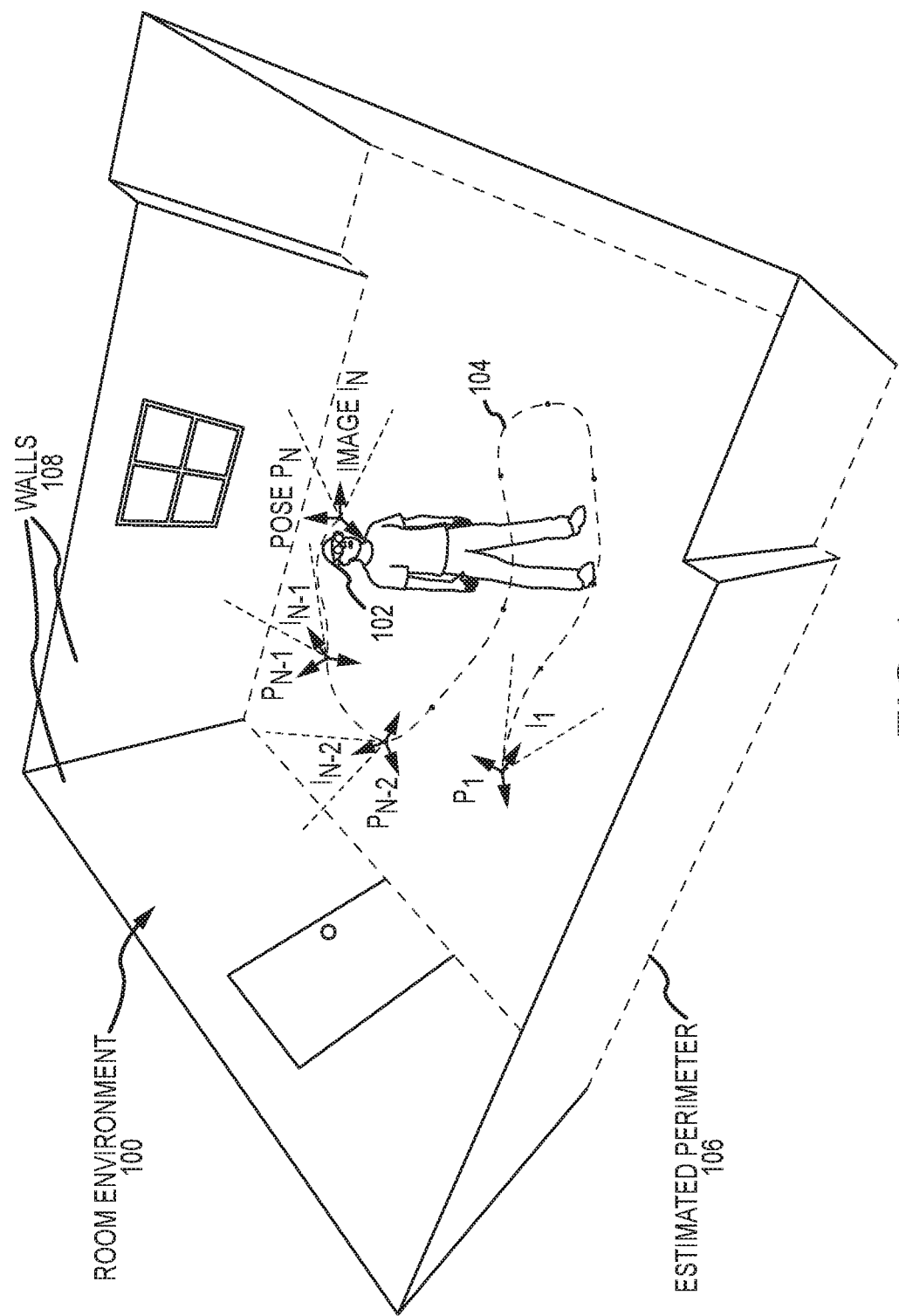
FIG. 1 illustrates an example implementation of the present invention for perimeter estimation of a room environment using a head-mounted display.

Understanding the three-dimensional (3D) layout of an interior can be important to understanding the long-range geometry of a space with myriad applications in augmented reality (AR), navigation, and general scene understanding. Such layouts can be presented in a variety of ways, including cuboid parameters, monocular corner coordinates and their connectivity, and more semantically rich full floor plans. Various methods differ in the amount of information they utilize at input and their assumptions regarding the room geometry. For example, some methods utilize a clean 3D point cloud at input while other methods utilize monocular perspective or panorama images. The lack of consistency between this set of related problems reveals a general disagreement over what the standard setting for layout prediction should be for indoor scenes.

In terms of sensor data, time-stamped red-green-blue (RGB) camera and pose data can be obtained from many modern devices (e.g. smartphones, AR and virtual reality (VR) head-mounted displays (HMDs), etc.). With a full video sequence corresponding to an interior, the problem to solve goes beyond the corner and edge estimation that pervade monocular layout estimation and becomes the estimation of the full perimeter layout of an interior space. Such metric information on the spatial extent and shape of a space can be seen as the first step for a variety of downstream 3D applications. Embodiments of the present invention are able to leverage current deep methods to precisely infer this perimeter with no enumerated set of the types of possible rooms and with robustness against corner and edge occlusions. In some instances, the horizontal perimeter (i.e. location of exterior walls) may be predicted as it contains the vast majority of the structure within a room layout while the walls and ceilings are usually well-approximated by a single plane.

In some embodiments, the disclosed pipeline starts with deep depth estimation on the RGB frames of the video sequence. One of the most restrictive bottlenecks for general 3D reconstruction applications of deep learning is the accuracy of deep depth estimation models. On cluttered indoor scenes like those in the NYUv2 dataset, such networks still may struggle to perform better than 0.5-0.6 meters of RMS error given monocular inputs. With the subject configurations, this performance bottleneck can be bypassed by incorporating temporal information into the depth estimation module using modern multi-view stereo methods instead.

With such embodiments, a deep segmentation can be trained to isolate the depth predictions corresponding to wall points. These predictions are projected to a 3D point cloud and then clustered through a novel deep network that is tuned to detect points that belong to the same plane instance. Once point clusters are assigned, methods are employed to translate the clusters into a full set of planes which form the full perimeter layout. By directly clustering wall points, embodiments provided herein perform well even when corners are occluded.

Embodiments disclosed herein relate to an unsupervised pipeline for generating a full indoor perimeter (i.e. exterior boundary map) from a monocular sequence of posed RGB images. In some embodiments of the present invention, various robust deep methods may be employed for depth estimation and wall segmentation to generate an exterior boundary point cloud and then use deep unsupervised clustering to fit wall planes to obtain a final boundary map of a room. Embodiments of the present invention result in excellent performance on the popular ScanNet dataset and work for room shapes of various complexities as well as in multiroom scenarios.

FIG. 1 illustrates an example implementation of the present invention for perimeter estimation of a room environment 100 using an HMD, such as an AR/VR HMD. In the illustrated example, a user wearing a wearable device 102 navigates a room along a trajectory 104, allowing an image capture device of wearable device 102 to capture a series of images $I_1, I_2, \ldots, I_N$ at a series of time stamps $T_1, T_2, \ldots, T_N$. Each of the images may include portions of one or more of a set of walls 108 that form room environment 100. Wearable device 102 may further capture a series of poses $P_1, P_2, \ldots, P_N$ at the series of time stamps $T_1, T_2, \ldots, T_N$ such that each of the images may be associated with a pose.

Each of the poses may include a position and/or an orientation. The position may be a 3D value (e.g., X, Y, and Z coordinates) and may correspond to the position from which the corresponding image was captured. The orientation may be a 3D value (e.g., pitch, yaw, roll angles) and may correspond to the orientation at which the corresponding image was captured. The poses may be determined using any sensor (referred to as a pose sensor) that captures data indicative of movement of wearable device 102. Based on the series of images $I_1, I_2, \ldots, I_N$ and corresponding poses $P_1, P_2, \ldots, P_N$, an estimated perimeter 106 for room environment 100 may be generated.

Figure 2:
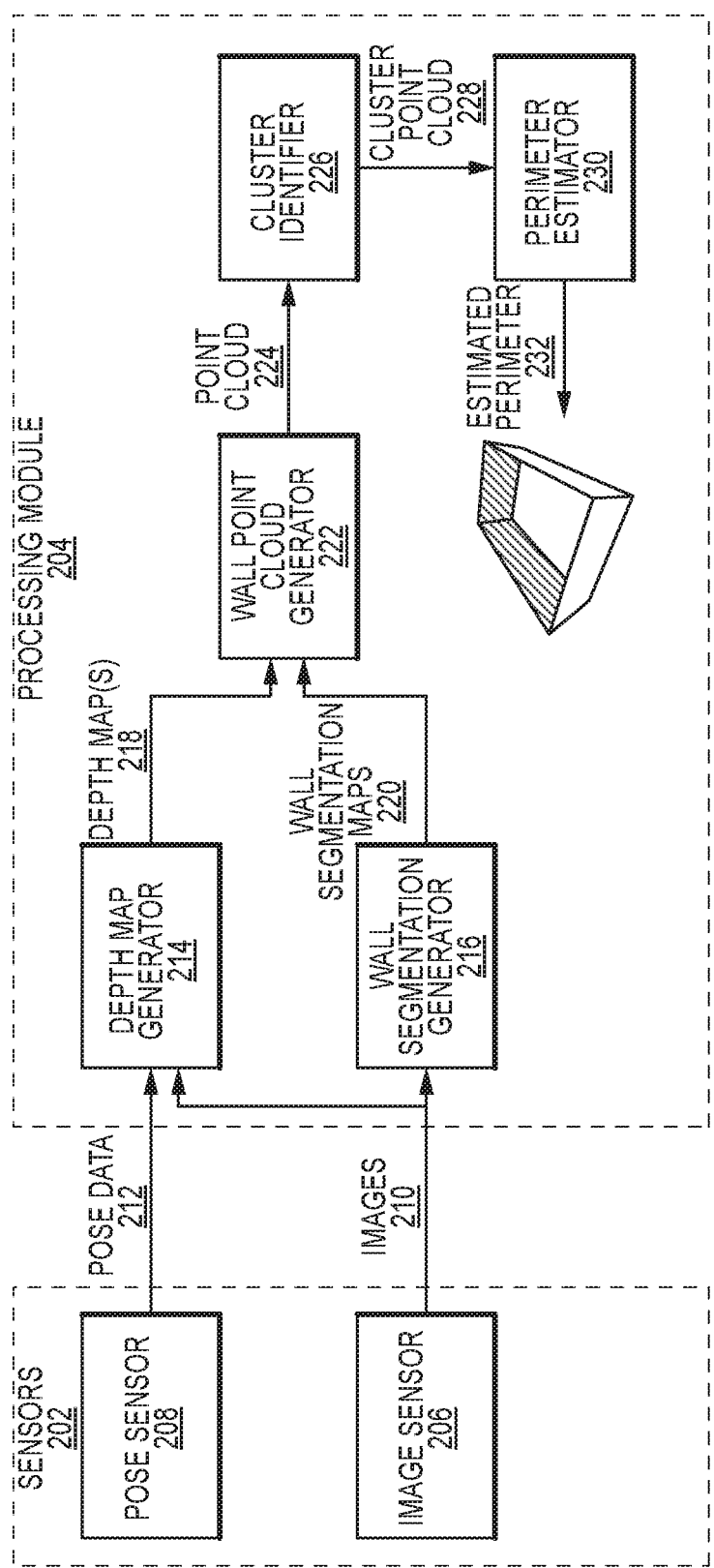
FIG. 2 illustrates an example system for estimating a perimeter of a room using posed images.

FIG. 2 illustrates an example system 200 for estimating a perimeter of a room using posed images, according to some embodiments of the present invention. In some implementations, system 200 may be incorporated into a wearable device. System 200 may include sensors 202 including an image sensor 206 and a pose sensor 208. Image sensor 206 may capture a series of images 210 of a set of walls. Each of images 210 may be an RGB image, a grayscale image, among other possibilities. Pose sensor 208 may capture pose data 212, which may include a series of poses corresponding to images 210. Each of the poses may include a position and/or an orientation corresponding to image sensor 206 such that the position and/or orientation from which each of images 210 was captured can be determined.

Images 210 and pose data 212 may be provided (e.g., sent, transmitted via a wired or wireless connection, etc.) to a processing module 204 for processing of the data. Processing module 204 may include a depth map generator 214, a wall segmentation generator 216, a wall point cloud generator 222, a cluster identifier 226, and a perimeter estimator 230. Each of the components of processing module 204 may correspond to hardware components such as field-programmable gate arrays (FPGAs) or application-specific integrated circuits (ASIC), among other possible integrated circuit devices. In some instances, one or more of the components of processing module 204 may be implemented in software and may be executed by a central-processing unit (CPU), a graphics processing unit (GPU), or a special-purpose processing unit such as a neural network accelerator. For example, two or more of the components of processing module 204 may be executed using a same bank of neural network accelerators or a same CPU or GPU.

Depth map generator 214 may receive images 210 and pose data 212 and may generate depth maps 218 based on images 210 and pose data 212. To generate depth maps from a posed monocular sequence, multiple observations of the same real world scenery from various poses can be utilized to generate a per-frame disparity map, which then can be inverted to generate a per-frame dense depth map. In some embodiments, depth map generator 214 may be implemented as a machine learning model such as a neural network. The input to the network is an input RGB image $I_i$ and a 3D cost volume $V_i$ constructed by calculating pixel-wise absolute intensity difference between $I_i$ and a neighboring frame $I_j$, when $I_i$ is projected into the reference frame $I_j$. To project a pixel of intensity $P^u_i$ in $I_i$ at location $u=(u,v)^T$, the pose of the reference frame $T_i$, pose of the neighboring frame $T_j$, and an assumed depth $d_n$ may be used as:

$$\tilde{u}=\pi(T_j^{-1}T_i\pi^{-1}(u,d_n))$$

where $\tilde{u}$ is the location of the projection in $I_j$ and $\pi$ represents a pinhole projection using the camera intrinsics. By varying $d_n$ between $d_{min}$ and $d_{max}$, the value of the 3D cost volume for $I_i$ at location u and sampled depth n can be calculated as:

$$C_i^{u,n}=|P^u_i-P^{\tilde{u}}_j|$$

To generate a cost volume from multiple neighboring frames, the pairwise cost volumes can be averaged.

Wall segmentation generator 216 may receive images 210 and may generate wall segmentation maps 220 based on images 210. In some embodiments, wall segmentation generator 216 may be implemented as a machine learning model such as a neural network. One goal of a semantic segmentation network may be to classify where the walls are within the scene, as they are the only points that belong to the interior perimeter. However, the ScanNet dataset floor/wall/ceiling annotations were found to be rather incomplete and erroneous; thus a different dataset was collected and was used for floor/wall/ceiling segmentation. In some instances, the segmentation network architecture may comprise a standard feature pyramid network based on a ResNet-101 backbone. Predictions may be outputted at a stride of 4 and upsampling layers may be implemented as pixelshuffle operations to increase network efficiency, especially for higher-stride upsampling layers (up to a stride of 8).

Wall point cloud generator 222 may receive depth maps 218 and wall segmentation maps 220 and may generate a point cloud 224 based on depth maps 218 and wall segmentation maps 220. A combined point cloud may be generated from several depth images for consumption by a clustering network. A collection of depth images with known pose trajectory may be fused in an implicit surface representation and the point cloud may be extracted by a derivative of the marching cubes method. One benefit of using an implicit surface representation over simply unprojecting each depth pixel is that it removes redundant points and it averages out the noise over multiple observations, leading to a smoother and cleaner set of vertices. To remove internal wall vertices, the concept of α-shape may be used to create a subset of the point cloud that is representative of its concave hull. Then, any point that does not lie within a radius r of the concave hull may be discarded, and the point cloud may be sub-sampled to N vertices.

Cluster identifier 226 may receive point clouds 224 and may generate a clustered point cloud 228 based on point clouds 224. A fully unsupervised technique of clustering unordered point clouds based on planar sections may be employed without explicitly computing said normals or plane parameters during an inference. Cluster identifier 226 may implemented as a machine learning model such as a neural network and, in some embodiments, may use the PointNet architecture as well as the PointNet global features to output a cluster probability for each input point.

In order to generate unique cluster assignments for separate wall instances, it is desirable to use a clustering technique that is robust to 3D location noise, occlusions, and variable point density. Furthermore, it is desirable that the clustering is able to distinguish between planar walls that are parallel and hence have the same point normals, but a different location in 3D space. A pairwise loss function can be formulated that allows causes a penalty to be incurred when two points belonging to apparently distinct classes are assigned the same label. Over-segmentation is not penalized as clusters belonging to the same true plane are easy to merge in post-processing. The input to the network is a set of N points P with 3D coordinates $P^x=(x,y,z)$, point normals $P^n=(nx,ny,nz)$ and predicted cluster probability vector Pp of length k for k clusters. The clustering loss $L^{cluster}$ is given as:

$$L^{cluster} = \sum_i^N \sum_j^N P_{ij} D_{ij}$$

where:

$$P_{ij} = P_i^p \cdot P_j^p$$

and:

$$D_{ij} = (P_i^x - P_j^x) \cdot P_i^n + (P_j^x - P_i^x) \cdot P_j^n$$

In order to flag noisy points which do not belong to a valid wall, a probability vector can be predicted of length k+1 when the number of maximum clusters is set to k, such that the k+1$^{th}$ label is reserved for noisy points. To prevent a trivial solution where all points are assigned the k+1$^{th}$ cluster, a regularization loss $L^{reg}$ can be used, which may be calculated as follows:

$$L^{reg} = \sum_i^N -1 \cdot \log(P_i^{plane})$$

where $P^{plane}_i$ is the sum of the probability vector over the first k classes, excluding the k+1$^{th}$ noise class. The total loss to be minimized is the sum of $L^{cluster}$ and $\alpha \cdot L^{reg}$, where $\alpha$ is a hyper-parameter intended to balance the losses.

Perimeter estimator 230 may receive clustered point cloud 228 and may generate an estimated perimeter 232 based on clustered point cloud 228. Given a point cloud with cluster labels generated by cluster identifier 226, a closed layout can be generated as described below. To keep the system design fairly modular, no assumptions need be made about the modality of the input points and hence the design may be robust to spurious points, outliers in the labeling, and missing walls. Following the assumption that all walls are parallel to the Z-axis, all the points may be projected to the X-Y plane to generate a top-down view of the point cloud. To establish connectivity among the clusters, the problem is formulated as a Traveling-Salesman-Problem to find a closed shortest path along all cluster medians. In some embodiments, the solution can calculated using the 2-opt algorithm.

If the number of true walls in the scene is less than the maximum of k assumed walls, there may be oversegmentation by cluster identifier 226. Hence, 2D line parameters may be estimated (e.g., using RANSAC), and walls with a relative normal deviation of less than 30° and an inter-cluster point-to-line error of less than $e_{merge}$ may be assigned the same label. After the merging step, following the Manhattan assumption, the lines are snapped to the nearest orthogonal axis and extended to intersect. The intersection point of two wall segments connected by a 2-opt edge is defined as a corner. For cases with major occlusions where entire wall segments have not been represented in the point cloud, it is possible that the two connected segments could be parallel. To generate a corner for such a pair, an endpoint of one of the segments can be extended in an orthogonal direction so as to force an intersection.

FIGS. 3A and 3B illustrate an example of a wall segmentation performed by wall segmentation generator 216, according to some embodiments of the present invention. In FIG. 3A, an image 302 captured by an image sensor is shown. When image 302 is provided as input to wall segmentation generator 216, a wall segmentation map 304 is generated, which is shown in FIG. 3B. Wall segmentation map 304 may include regions that are determined to correspond to walls and regions that are not determined to correspond to walls. The former may each be designated as a target region 306, such that target region 306 of corresponding image 302 is similarly determined to correspond to (e.g., to include) a wall.

Figure 4B:
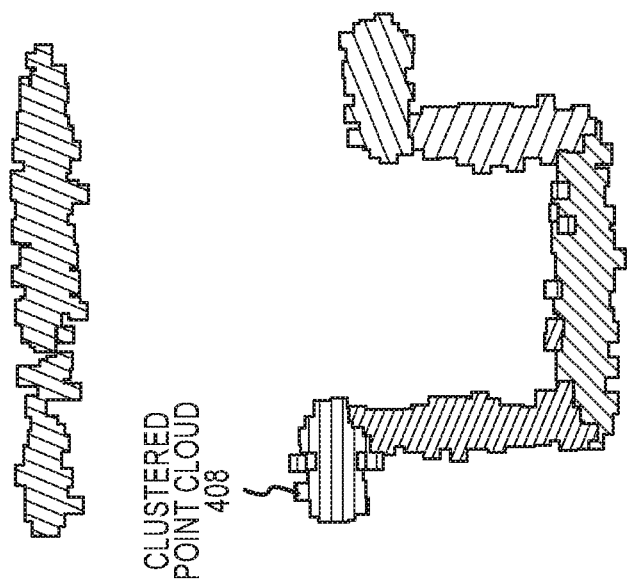
FIGS. 4A-4D illustrate example steps for generating a perimeter.
Figure 4A:
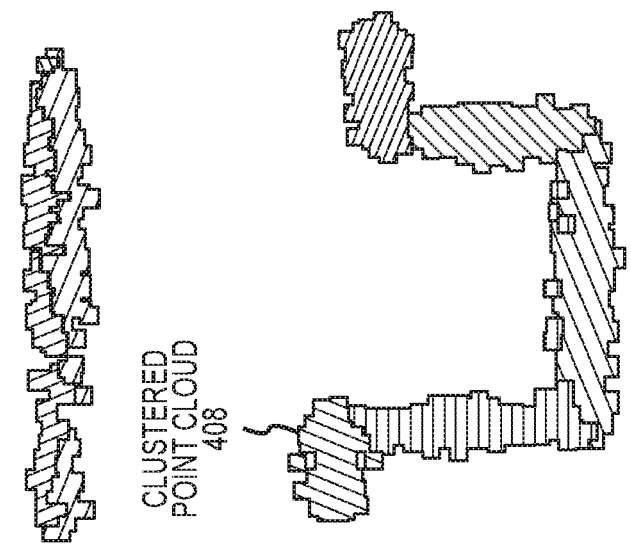
Figure 4D:
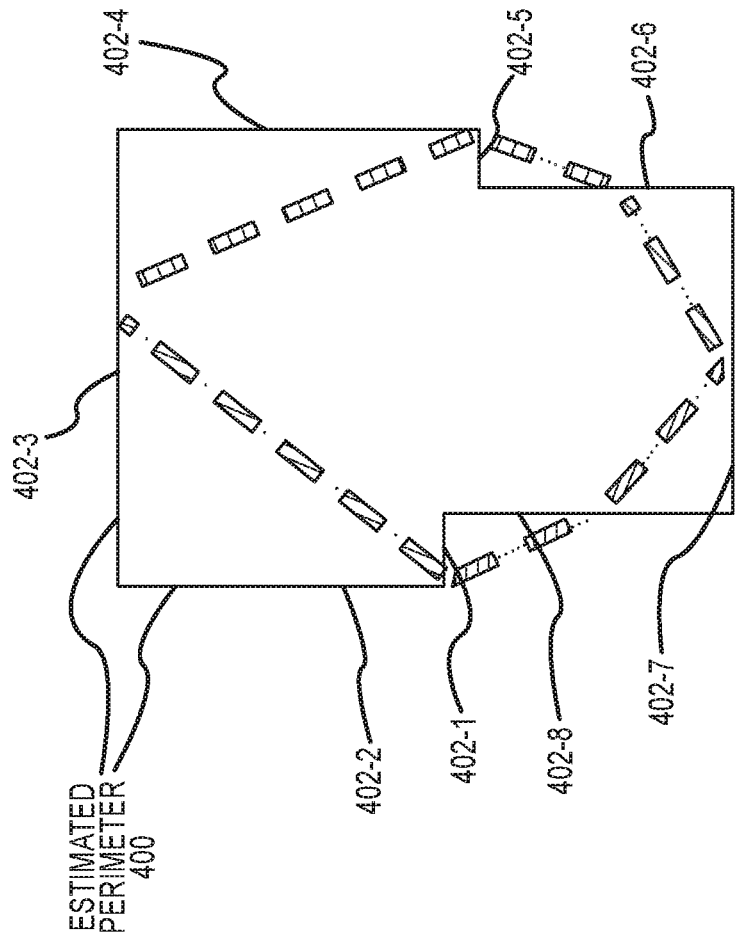
Figure 4C:
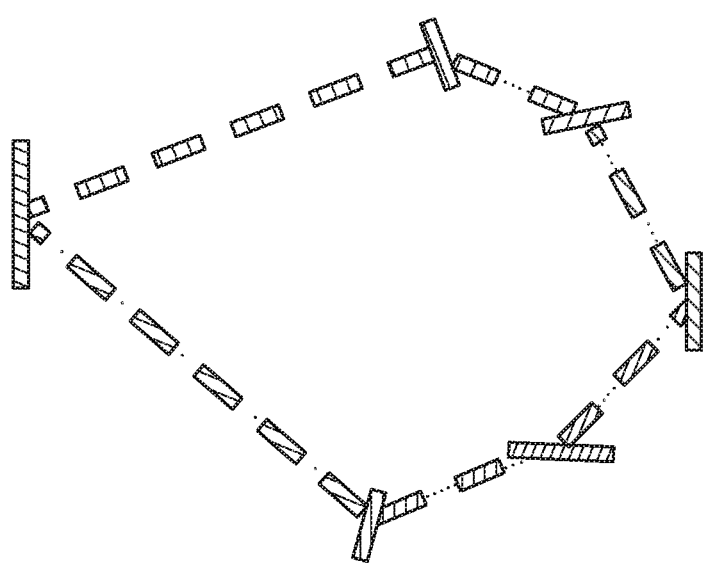

FIGS. 4A-4D illustrate example steps for generating a perimeter, according to some embodiments of the present invention. In FIG. 4A, raw outputs are generated by cluster identifier 226 with possible oversegmentation. In FIG. 4B, more compact clustering is obtained by cluster identifier 226 resulting from merging duplicate clusters. In FIG. 4C, estimated line parameters and inter-cluster connectivity are produced. In some instances, a center of each cluster is determined by identifying a median or average point. The centers of the clusters are then connected by finding a closed shortest path along all cluster centers, as described above.

In FIG. 4D, lines or planes are fitted to each of the clusters using, for example, a curve fitting algorithm. For example, if the points in each of the clusters are 2D points, then a line is fitted to the 2D points for each of the clusters. If the points in each of the clusters are 3D points, then a plane is fitted to the 3D points for each of the clusters. In some embodiments, orthogonality and intersections may be forced on connected parallel lines to generate a closed perimeter. For example, since lines 402-1 and 402-3 are parallel and would otherwise be unconnected, line 402-2 is formed to connect the lines and close the perimeter. Similarly, since lines 402-3 and 402-5 are parallel and would otherwise be unconnected, line 402-4 is formed to connect the lines and close the perimeter.

Figure 5:
FIG. 5 illustrates example training data for training a cluster identifier.

FIG. 5 illustrates example training data 500 for training cluster identifier 226, according to some embodiments of the present invention. In some embodiments, training data 500 may be a fully synthetic dataset with synthetic normals. To generate training data 500, a room boundary may be drawn on a 2D domain with a room shape randomly sampled from a rectangle, L-shape, T-shape, or U-shape, with the length of each edge uniformly sampled in the range of [1 m,5 m] and the orientation uniformly sampled in the range of [0,2π]. The line drawing may then be projected vertically to get a 3D model with height randomly sampled from the range [1.5 m,2.5 m]. The point cloud input can then be generated by uniformly sampling from 3D faces of the model. Point normals are calculated from the 3D faces of the model.

To better mimic data generated from imperfect sensors or depth estimation algorithms, points may be dropped in a number of cylinders (e.g., 5 cylinders), with each cylinder having a center defined by a randomly sampled point, a radius randomly sampled from [0.5 m,1.5 m], and an infinite length. The deleting process is stopped if the number of remaining points will be less than 10% of the original number of points. Finally, noise of a Gaussian distribution is added with σ=0 and μ=0.015 to each remaining point.

Figure 6:
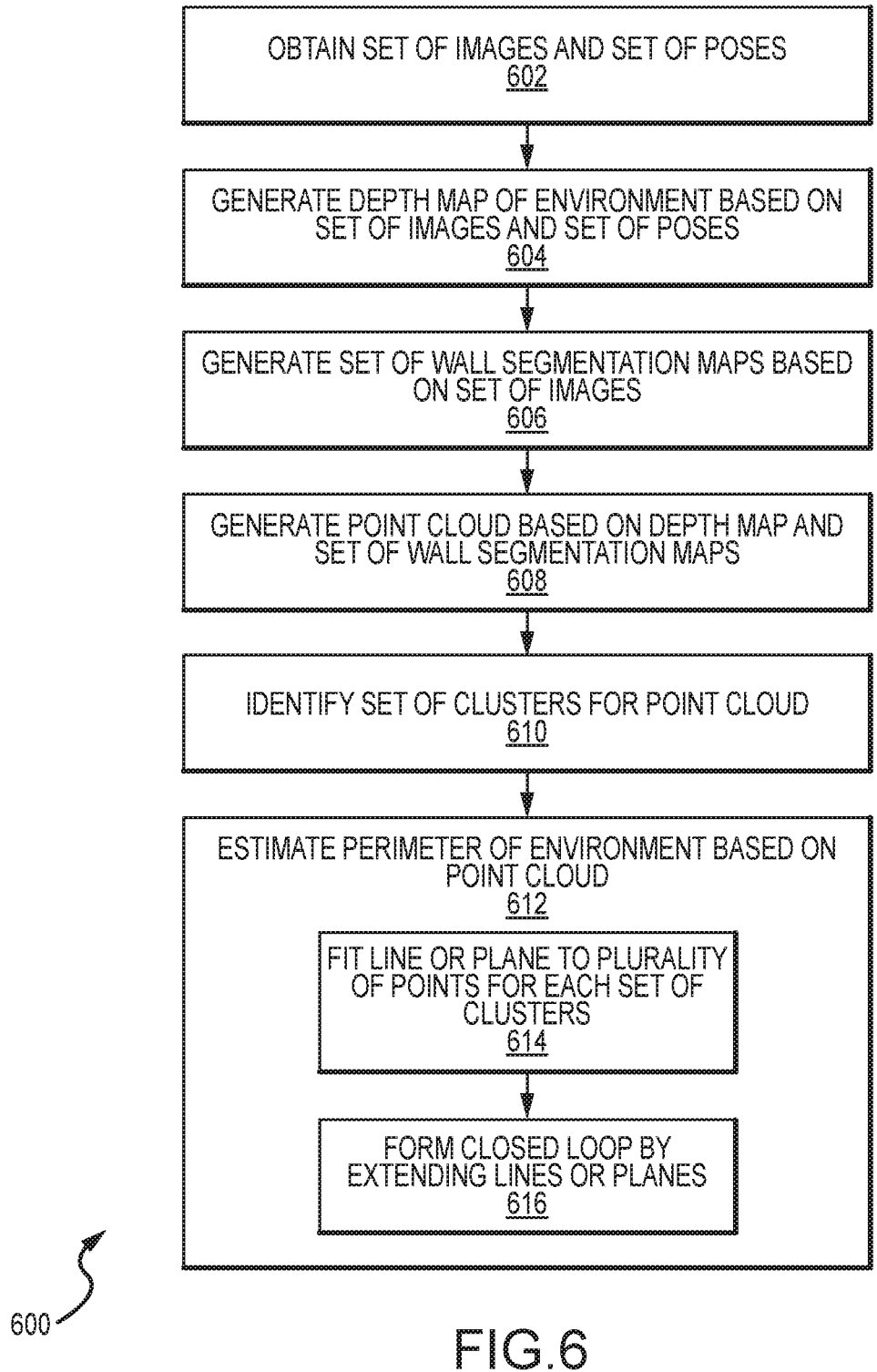
FIG. 6 illustrates a method of estimating a perimeter of an environment.

FIG. 6 illustrates a method 600 of estimating a perimeter of an environment (e.g., room environment 100) at least partially enclosed by a set of adjoining walls (e.g., walls 108), according to some embodiments of the present invention. One or more steps of method 600 may be omitted during performance of method 600, and one or more steps of method 600 need not be performed in the order shown. One or more steps of method 600 may be performed or facilitated by one or more processors included in a system or device (e.g., a wearable device such as an AR/VR device).

At step 602, a set of images (e.g., images 210) and a set of poses (e.g., pose data 212) corresponding to the set of images are obtained. The set of images may be images of the environment and each image may include one or more of the set walls. Each of the set of poses may be captured at a same time as one of the set of images such that a position and/or an orientation for each of the set of images may be determined. In some embodiments, the set of images and the set of poses may be captured by a set of sensors (e.g., sensors 202) of a system or device (e.g., system 200). In some embodiments, the set of images may be captured by an image sensor (e.g., image sensor 206) and the set of poses may be captured by a pose sensor (e.g., pose sensor 208). The image sensor may be a camera or some other image capture device. The pose sensor may be an inertial measurement unit (IMU), an accelerometer, a gyroscope, a tilt sensor, or any combination thereof. In some embodiments, the set of poses may be determined from the set of images themselves, such that the pose sensor and the image sensor may be the same sensor.

At step 604, a depth map (e.g., depth map 218) of the environment may be generated based on the set of images and the set of poses. The depth map may be a cumulative depth map combining multiple (or all) images from the set of images or, in some embodiments, a depth map may be generated for each of the set of images. In some embodiments, the depth map may be generated by a depth map generator (e.g., depth map generator 214), which may be a machine learning model (e.g., a neural network) trained to output a depth map when provided with a set of images and a set of poses as inputs.

At step 606, a set of wall segmentation maps (e.g., wall segmentation maps 220) may be generated based on the set of images. Each of the set of wall segmentation maps (e.g., wall segmentation map 304) may indicate a target region (e.g., target region 306) of a corresponding image from the set of images that contains the set of adjoining walls. In some embodiments, the set of wall segmentation maps may be generated by a wall segmentation generator (e.g., wall segmentation generator 216), which may be a machine learning model (e.g., a neural network) trained to output a wall segmentation map when provided with an image as input.

At step 608, a point cloud (e.g., point cloud 224) is generated based on the depth map and the set of wall segmentation maps. The point cloud may include a plurality of points that are sampled along portions of the depth map that align with the target region. In some embodiments, the point cloud may be generated by a wall point cloud generator (e.g., wall point cloud generator 222), which may be a machine learning model (e.g., a neural network) trained to output a point cloud when provided with a depth map and a set of wall segmentation maps as inputs.

At step 610, a set of clusters (e.g., the clusters of clustered point cloud 408) are identified for the point cloud. Each of the set of clusters may include a subset of the plurality of points. Each of the clusters is intended to correspond to a different wall from the set of adjoining walls. Clusters that are determined to correspond to the same wall from the set of adjoining walls may be combined into a single cluster. In some embodiments, the set of clusters may be identified by a cluster identifier (e.g., cluster identifier 226), which may be a machine learning model (e.g., a neural network) trained to output a set of clusters and/or a clustered point cloud (e.g., clustered point cloud 228) when provided with a point cloud as input.

At step 612, a perimeter (e.g., estimated perimeters 106 and 232) of the environment along the set of adjoining walls is estimated based on the point cloud. In some embodiments, step 612 includes one or both of steps 614 and 616.

At step 614, if the plurality of points include 2D points, a line is fitted to the plurality of points for each of the set of clusters, resulting in a plurality of lines. If the plurality of points include 3D points, a plane is fitted to the plurality of points for each of the set of clusters, resulting in a plurality of planes. Line fitting or plane fitting may be accomplishing using, for example, a curve fitting approach.

At step 616, if the plurality of points include 2D points, a closed loop is formed by extending the plurality of lines until reaching intersection points. If the plurality of points include 3D points, a closed loop is formed by extending the plurality of planes until reaching intersection lines.

Figure 7:
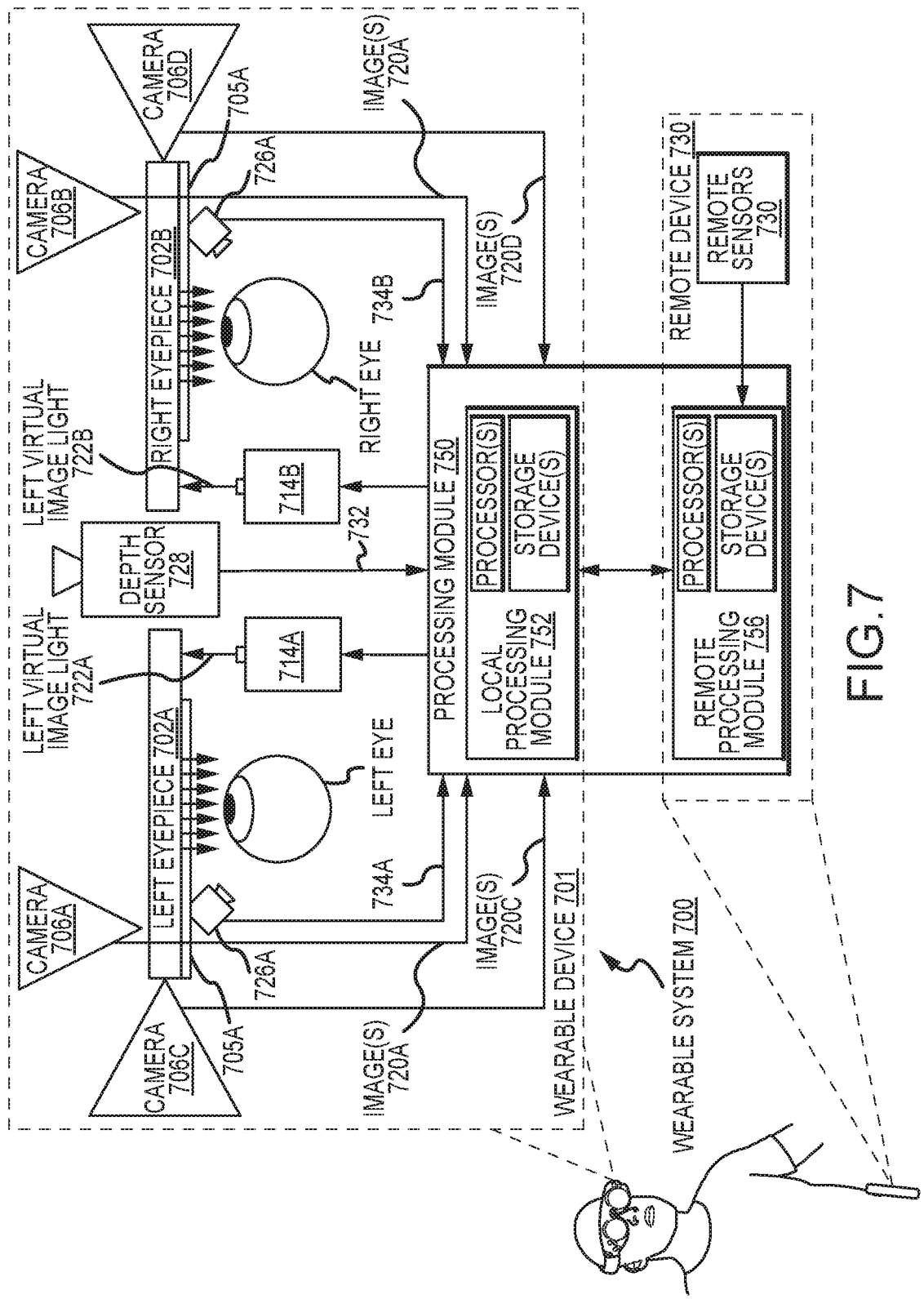
FIG. 7 illustrates an example system or device that may implement one or more of the described techniques.

FIG. 7 illustrates an example system or device that may implement one or more of the described techniques. Specifically, FIG. 7 illustrates a schematic view of a wearable system 700, according to some embodiments of the present invention. Wearable system 700 may include a wearable device 701 and at least one remote device 703 that is remote from wearable device 701 (e.g., separate hardware but communicatively coupled). While wearable device 701 is worn by a user (generally as a headset), remote device 703 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 701 may include a left eyepiece 702A and a left lens assembly 705A arranged in a side-by-side configuration and constituting a left optical stack. Left lens assembly 705A may include an accommodating lens on the user side of the left optical stack as well as a compensating lens on the world side of the left optical stack. Similarly, wearable device 701 may include a right eyepiece 702B and a right lens assembly 705B arranged in a side-by-side configuration and constituting a right optical stack. Right lens assembly 705B may include an accommodating lens on the user side of the right optical stack as well as a compensating lens on the world side of the right optical stack.

In some embodiments, wearable device 701 includes one or more sensors including, but not limited to: a left front-facing world camera 706A attached directly to or near left eyepiece 702A, a right front-facing world camera 706B attached directly to or near right eyepiece 702B, a left side-facing world camera 706C attached directly to or near left eyepiece 702A, a right side-facing world camera 706D attached directly to or near right eyepiece 702B, a left eye tracking camera 726A directed toward the left eye, a right eye tracking camera 726B directed toward the right eye, and a depth sensor 728 attached between eyepieces 702. Wearable device 701 may include one or more image projection devices such as a left projector 714A optically linked to left eyepiece 702A and a right projector 714B optically linked to right eyepiece 702B.

Wearable system 700 may include a processing module 750 for collecting, processing, and/or controlling data within the system. Components of processing module 750 may be distributed between wearable device 701 and remote device 703. For example, processing module 750 may include a local processing module 752 on the wearable portion of wearable system 700 and a remote processing module 756 physically separate from and communicatively linked to local processing module 752. Each of local processing module 752 and remote processing module 756 may include one or more processing units (e.g., central processing units (CPUs), graphics processing units (GPUs), etc.) and one or more storage devices, such as non-volatile memory (e.g., flash memory).

Processing module 750 may collect the data captured by various sensors of wearable system 700, such as cameras 706, eye tracking cameras 726, depth sensor 728, remote sensors 730, ambient light sensors, microphones, IMUs, accelerometers, compasses, Global Navigation Satellite System (GNSS) units, radio devices, and/or gyroscopes. For example, processing module 750 may receive image(s) 720 from cameras 706. Specifically, processing module 750 may receive left front image(s) 720A from left front-facing world camera 706A, right front image(s) 720B from right front-facing world camera 706B, left side image(s) 720C from left side-facing world camera 706C, and right side image(s) 720D from right side-facing world camera 706D. In some embodiments, image(s) 720 may include a single image, a pair of images, a video comprising a stream of images, a video comprising a stream of paired images, and the like. Image(s) 720 may be periodically generated and sent to processing module 750 while wearable system 700 is powered on, or may be generated in response to an instruction sent by processing module 750 to one or more of the cameras.

Cameras 706 may be configured in various positions and orientations along the outer surface of wearable device 701 so as to capture images of the user's surrounding. In some instances, cameras 706A, 706B may be positioned to capture images that substantially overlap with the FOVs of a user's left and right eyes, respectively. Accordingly, placement of cameras 706 may be near a user's eyes but not so near as to obscure the user's FOV. Alternatively or additionally, cameras 706A, 706B may be positioned so as to align with the incoupling locations of virtual image light 722A, 722B, respectively. Cameras 706C, 706D may be positioned to capture images to the side of a user, e.g., in a user's peripheral vision or outside the user's peripheral vision. Image(s) 720C, 720D captured using cameras 706C, 706D need not necessarily overlap with image(s) 720A, 720B captured using cameras 706A, 706B.

In some embodiments, processing module 750 may receive ambient light information from an ambient light sensor. The ambient light information may indicate a brightness value or a range of spatially-resolved brightness values. Depth sensor 728 may capture a depth image 732 in a front-facing direction of wearable device 701. Each value of depth image 732 may correspond to a distance between depth sensor 728 and the nearest detected object in a particular direction. As another example, processing module 750 may receive eye tracking data 734 from eye tracking cameras 726, which may include images of the left and right eyes. As another example, processing module 750 may receive projected image brightness values from one or both of projectors 714. Remote sensors 730 located within remote device 703 may include any of the above-described sensors with similar functionality.

Virtual content is delivered to the user of wearable system 700 using projectors 714 and eyepieces 702, along with other components in the optical stacks. For instance, eyepieces 702A, 702B may comprise transparent or semi-transparent waveguides configured to direct and outcouple light generated by projectors 714A, 714B, respectively. Specifically, processing module 750 may cause left projector 714A to output left virtual image light 722A onto left eyepiece 702A, and may cause right projector 714B to output right virtual image light 722B onto right eyepiece 702B. In some embodiments, projectors 714 may include micro-electromechical system (MEMS) spatial light modulator (SLM) scanning devices. In some embodiments, each of eyepieces 702A, 702B may comprise a plurality of waveguides corresponding to different colors. In some embodiments, lens assemblies 705A, 705B may be coupled to and/or integrated with eyepieces 702A, 702B. For example, lens assemblies 705A, 705B may be incorporated into a multi-layer eyepiece and may form one or more layers that make up one of eyepieces 702A, 702B.

Figure 8:
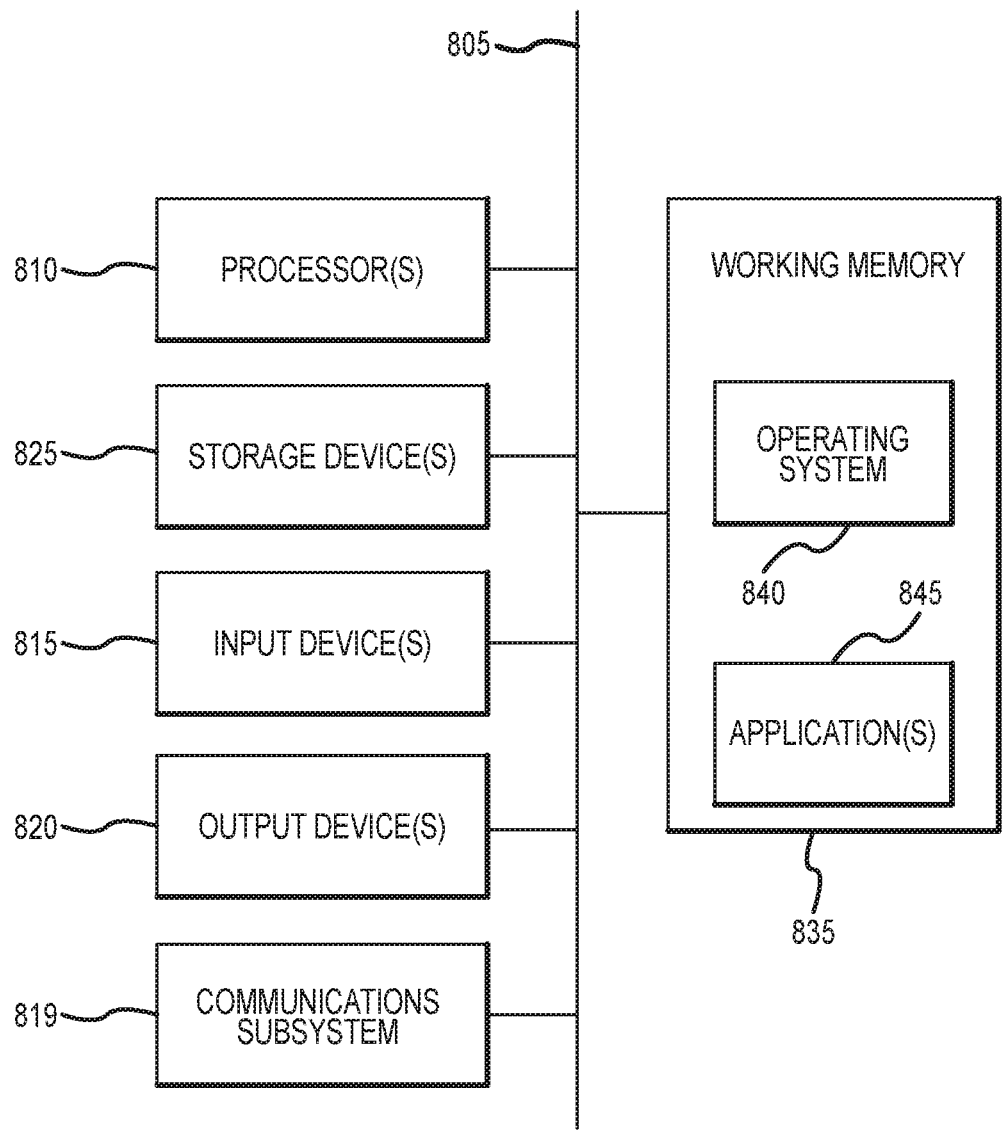
FIG. 8 illustrates a simplified computer system.

FIG. 8 illustrates a simplified computer system 800 according to an embodiment described herein. Computer system 800 as illustrated in FIG. 8 may be incorporated into devices described herein. FIG. 8 provides a schematic illustration of one embodiment of computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

Computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include without limitation a mouse, a keyboard, a camera, and/or the like; and one or more output devices 820, which can include without limitation a display device, a printer, and/or the like.

Computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 800 might also include a communications subsystem 819, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 819 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 819. In other embodiments, a portable electronic device, e.g. the first electronic device, may be incorporated into computer system 800, e.g., an electronic device as an input device 815. In some embodiments, computer system 800 will further comprise a working memory 835, which can include a RAM or ROM device, as described above.

Computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or conFIG. systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to conFIG. and/or adapt a general purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 800 and/or might take the form of source and/or installable code, which, upon compilation and/or installation on computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 800 to perform methods in accordance with various embodiments of the technology. According to a set of embodiments, some or all of the procedures of such methods are performed by computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 800.

The communications subsystem 819 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
   obtaining a set of images and a set of poses corresponding to the set of images, the set of images having been captured of an environment at least partially enclosed by a set of adjoining walls;
   generating a depth map of the environment from the set of images and the set of poses, wherein the depth map includes a surface representation;
   generating a set of wall segmentation maps by providing the set of images to a machine learning model, the machine learning model having been trained to output wall segmentation maps based on image inputs, each of the set of wall segmentation maps indicating one or more regions of a corresponding image from the set of images that contain the set of adjoining walls;
   after generating the depth map and the set of wall segmentation maps, generating a point cloud including a plurality of points by sampling the depth map along portions of the depth map that are aligned with the one or more regions, wherein sampling the depth map includes sampling the surface representation of the depth map;
   identifying a set of clusters for the point cloud, each of the set of clusters including a subset of the plurality of points, and wherein each of the set of clusters is determined to correspond to a different wall from the set of adjoining walls; and
   estimating a perimeter of the environment along the set of adjoining walls by fitting a line or plane to the plurality of points for each of the set of clusters.

2. The method of claim 1, further comprising:
   capturing, using one or more sensors, the set of images and the set of poses, wherein obtaining the set of images and the set of poses includes receiving the set of images and the set of poses from the one or more sensors.

3. The method of claim 2, wherein the one or more sensors includes an image sensor configured to capture the set of images and a pose sensor configured to capture the set of poses.

4. The method of claim 1, wherein the plurality of points include 2D points, and wherein estimating the perimeter of the environment along the set of adjoining walls based on the point cloud includes:
   fitting the line to the plurality of points for each of the set of clusters, resulting in a plurality of lines; and
   forming a closed loop by extending the plurality of lines until reaching intersection points.

5. The method of claim 1, wherein the plurality of points include 3D points, and wherein estimating the perimeter of the environment along the set of adjoining walls based on the point cloud includes:
   fitting the plane to the plurality of points for each of the set of clusters, resulting in a plurality of planes; and
   forming a closed loop by extending the plurality of planes until reaching intersection lines.

6. The method of claim 1, wherein the set of images include RGB images.

7. The method of claim 1, wherein the set of poses include camera orientations of an image sensor that captured the set of images.

8. The method of claim 1, wherein the plurality of points include 3D points.

9. A system comprising:
   one or more processors; and
   a computer-readable medium comprising instructions that, when executed by the one or more processors, cause the one or more processors to perform operations comprising:
     obtaining a set of images and a set of poses corresponding to the set of images, the set of images having been captured of an environment at least partially enclosed by a set of adjoining walls;
     generating a depth map of the environment from the set of images and the set of poses, wherein the depth map includes a surface representation;
     generating a set of wall segmentation maps by providing the set of images to a machine learning model, the machine learning model having been trained to output wall segmentation maps based on image inputs, each of the set of wall segmentation maps indicating one or more regions of a corresponding image from the set of images that contain the set of adjoining walls;
     after generating the depth map and the set of wall segmentation maps, generating a point cloud including a plurality of points by sampling the depth map along portions of the depth map that are aligned with the one or more regions, wherein sampling the depth map includes sampling the surface representation of the depth map;

identifying a set of clusters for the point cloud, each of the set of clusters including a subset of the plurality of points, and wherein each of the set of clusters is determined to correspond to a different wall from the set of adjoining walls; and estimating a perimeter of the environment along the set of adjoining walls by fitting a line or plane to the plurality of points for each of the set of clusters.

10. The system of claim 9, wherein the operations further comprise:

capturing, using one or more sensors, the set of images and the set of poses, wherein obtaining the set of images and the set of poses includes receiving the set of images and the set of poses from the one or more sensors.

11. The system of claim 10, wherein the one or more sensors includes an image sensor configured to capture the set of images and a pose sensor configured to capture the set of poses.

12. The system of claim 9, wherein the plurality of points include 2D points, and wherein estimating the perimeter of the environment along the set of adjoining walls based on the point cloud includes:

fitting the line to the plurality of points for each of the set of clusters, resulting in a plurality of lines; and forming a closed loop by extending the plurality of lines until reaching intersection points.

13. The system of claim 9, wherein the plurality of points include 3D points, and wherein estimating the perimeter of the environment along the set of adjoining walls based on the point cloud includes:

fitting the plane to the plurality of points for each of the set of clusters, resulting in a plurality of planes; and forming a closed loop by extending the plurality of planes until reaching intersection lines.

14. The system of claim 9, wherein the set of images include RGB images.

15. A non-transitory computer-readable medium comprising instructions that, when executed by one or more processors, cause the one or more processors to perform operations comprising:

obtaining a set of images and a set of poses corresponding to the set of images, the set of images having been captured of an environment at least partially enclosed by a set of adjoining walls;

generating a depth map of the environment from the set of images and the set of poses, wherein the depth map includes a surface representation;

generating a set of wall segmentation maps by providing the set of images to a machine learning model, the machine learning model having been trained to output wall segmentation maps based on image inputs, each of the set of wall segmentation maps indicating one or more regions of a corresponding image from the set of images that contain the set of adjoining walls;

after generating the depth map and the set of wall segmentation maps, generating a point cloud including a plurality of points by sampling the depth map along portions of the depth map that are aligned with the one or more regions, wherein sampling the depth map includes sampling the surface representation of the depth map;

identifying a set of clusters for the point cloud, each of the set of clusters including a subset of the plurality of points, and wherein each of the set of clusters is determined to correspond to a different wall from the set of adjoining walls; and estimating a perimeter of the environment along the set of adjoining walls by fitting a line or plane to the plurality of points for each of the set of clusters.

16. The non-transitory computer-readable medium of claim 15, wherein the operations further comprise:

capturing, using one or more sensors, the set of images and the set of poses, wherein obtaining the set of images and the set of poses includes receiving the set of images and the set of poses from the one or more sensors.

17. The non-transitory computer-readable medium of claim 16, wherein the one or more sensors includes an image sensor configured to capture the set of images and a pose sensor configured to capture the set of poses.

18. The non-transitory computer-readable medium of claim 15, wherein the plurality of points include 2D points, and wherein estimating the perimeter of the environment along the set of adjoining walls based on the point cloud includes:

fitting the line to the plurality of points for each of the set of clusters, resulting in a plurality of lines; and forming a closed loop by extending the plurality of lines until reaching intersection points.

19. The non-transitory computer-readable medium of claim 15, wherein the plurality of points include 3D points, and wherein estimating the perimeter of the environment along the set of adjoining walls based on the point cloud includes:

fitting the plane to the plurality of points for each of the set of clusters, resulting in a plurality of planes; and forming a closed loop by extending the plurality of planes until reaching intersection lines.

20. The non-transitory computer-readable medium of claim 15, wherein the set of images include RGB images.

* * * * *